United States Patent [19]

Brechner et al.

[11] Patent Number: 5,613,049
[45] Date of Patent: Mar. 18, 1997

[54] METHOD FOR CREATING SPATIALLY BALANCED BOUNDING VOLUME HIERARCHIES FOR USE IN A COMPUTER GENERATED DISPLAY OF A COMPLEX STRUCTURE

[75] Inventors: Eric L. Brechner, Redmond; Virgil E. Bourassa, Bellevue, both of Wash.

[73] Assignee: The Boeing Company, Seattle, Wash.

[21] Appl. No.: 329,356

[22] Filed: Oct. 26, 1994

[51] Int. Cl.$^6$ .................................................. G06T 5/00
[52] U.S. Cl. ............................................................ 395/120
[58] Field of Search ................................... 395/120, 119, 395/124, 127

[56] References Cited

U.S. PATENT DOCUMENTS

| | | | |
|---|---|---|---|
| 4,631,690 | 12/1986 | Corthout et al. | 395/120 |
| 4,862,392 | 8/1989 | Steiner | 395/127 |
| 4,901,252 | 2/1990 | Fitzgerald et al. | 395/121 |
| 4,912,659 | 3/1990 | Liang | 395/134 |
| 4,922,430 | 5/1990 | Wavish | 364/461 |
| 4,967,375 | 10/1990 | Pelham et al. | 395/166 |
| 4,982,180 | 1/1991 | Seki et al. | 345/139 |
| 5,048,095 | 9/1991 | Bhann et al. | 382/173 |
| 5,088,054 | 2/1992 | Paris, II | 395/121 |
| 5,144,685 | 9/1992 | Nasar et al. | 382/153 |
| 5,363,475 | 11/1994 | Baker et al. | 395/122 |
| 5,434,617 | 7/1995 | Bianchi | 348/170 |
| 5,442,733 | 8/1995 | Kaufman et al. | 395/124 |
| 5,448,686 | 9/1995 | Borrel et al. | 395/120 |

OTHER PUBLICATIONS

Kay et al.; *Ray Tracing Complex Scence*; 1986; pp. 269–278.

Goldsmith et al.; *Automatic Creation of Object Hierarchies for Ray Tracing*; 1987; pp. 14–20.

Teller et al.; *Global Visibility Algorithms for Illumination Computations*; 1993; pp. 239–246.

Funkhouser et al.; *Adaptive Display Algorithms for Interactive Frame Rates During Visualization of Complex Virtual Environments*; 1993; pp. 247–254.

Heckbert et al.; *Multiresolution Modeling for Fast Rendering*; 1994; pp. 43–50.

*Primary Examiner*—Phu K. Nguyen
*Assistant Examiner*—Cliff N. Vo
*Attorney, Agent, or Firm*—James P. Hamley

[57] ABSTRACT

Disclosed is a method for processing an arbitrary collection of objects, forming a complex structure, into a hierarchy of bounding volumes, from a root volume bounding all objects, to sub-volumes bounding individual objects or assemblies thereof, for use as successive approximations to said objects in a computer generated display. The method includes the first step of creating a bounding volume for each of the objects. Selected bounding volumes are then processed through a combining algorithm determining whether or not, based upon a geometric relationship between the bounding volumes and the higher level, root volume, the selected bounding volumes can be combined. If it is determined that the bounding volumes can be combined, a new bounding volume is created with the combined volumes comprising sub-volumes thereof. This process systematically repeats and attempts to combine all sub-volumes. The combining algorithm preferably allows a combination if the volumes of the combination of the sub-volume is smaller than a fixed percentage of the parent volume. When a pair can combine, it is replaced by a box bounding volume that contains the pair as sub-volumes, and the process continues. In this way, a bounding volume hierarchy for all objects and assemblies within a complex structure is created.

43 Claims, 12 Drawing Sheets

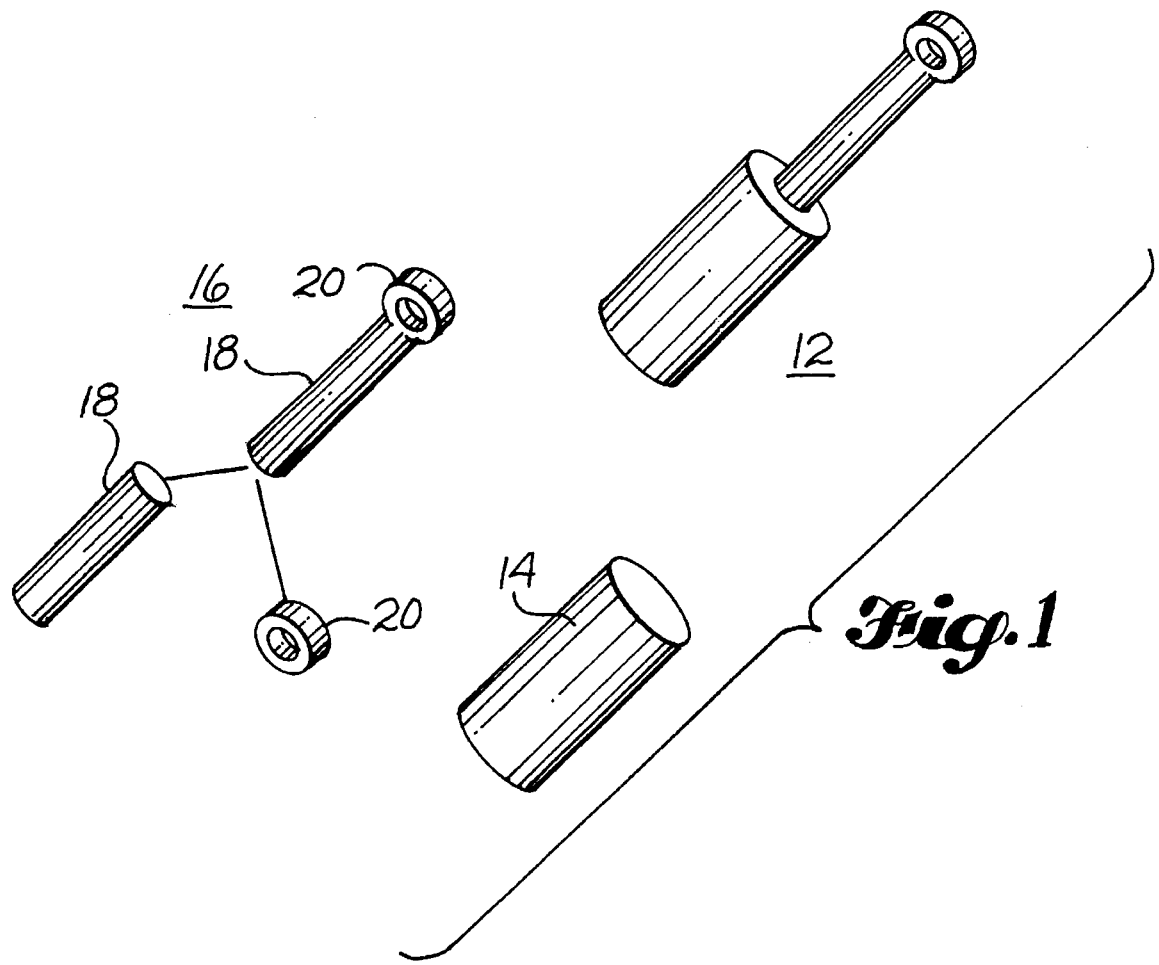
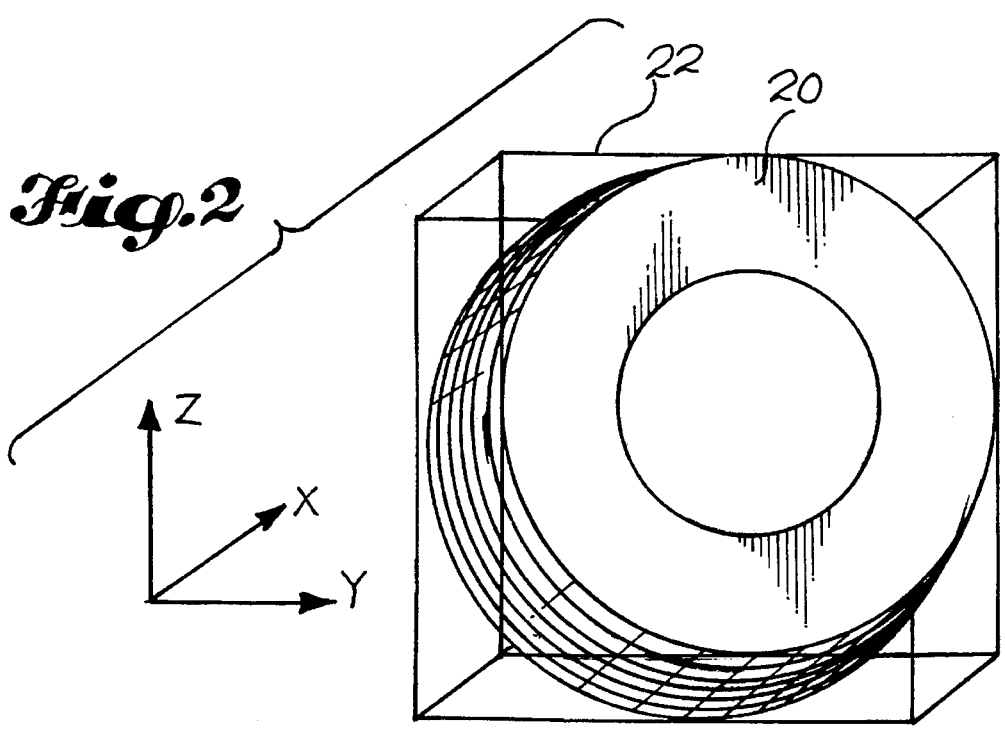

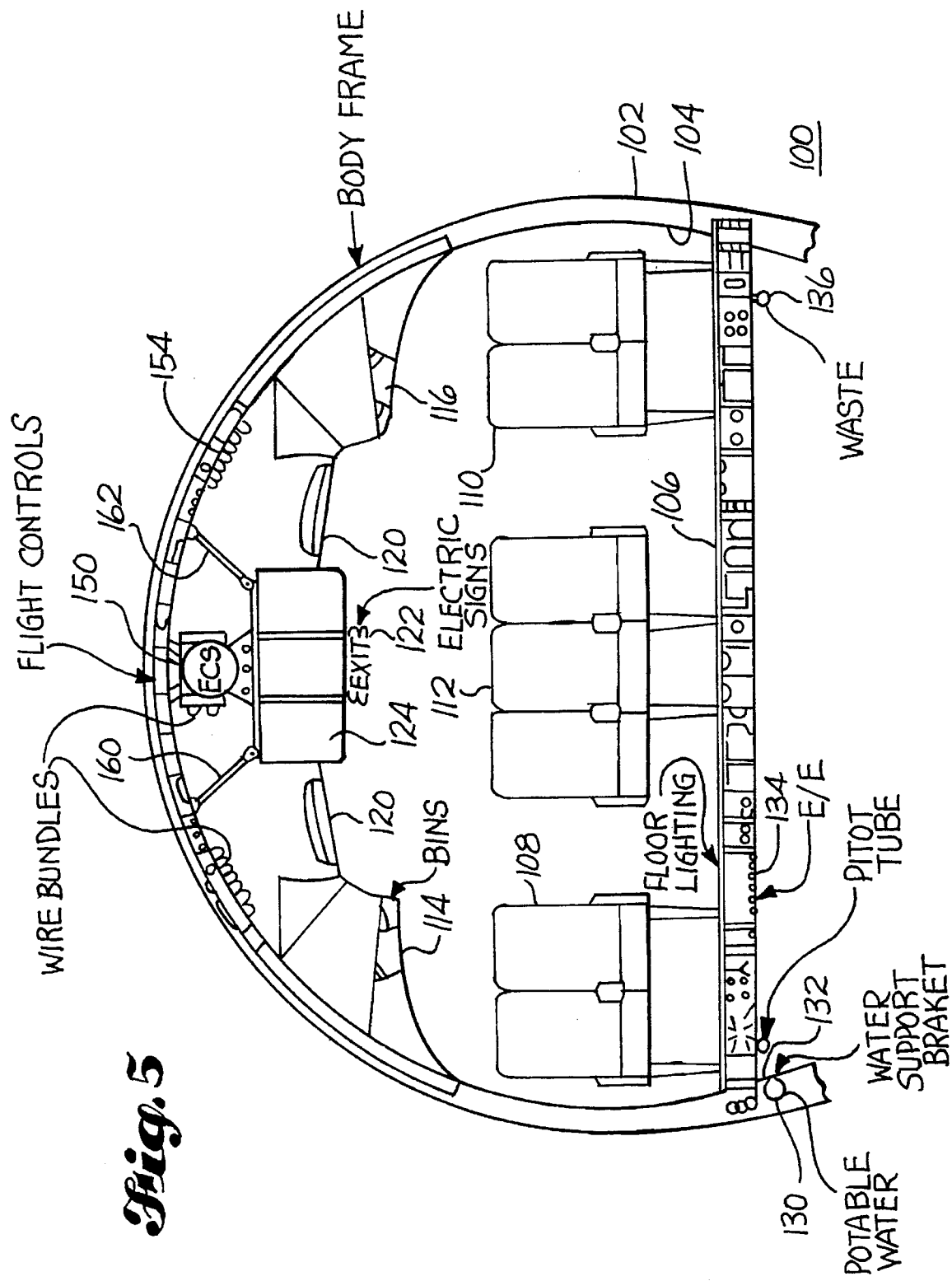

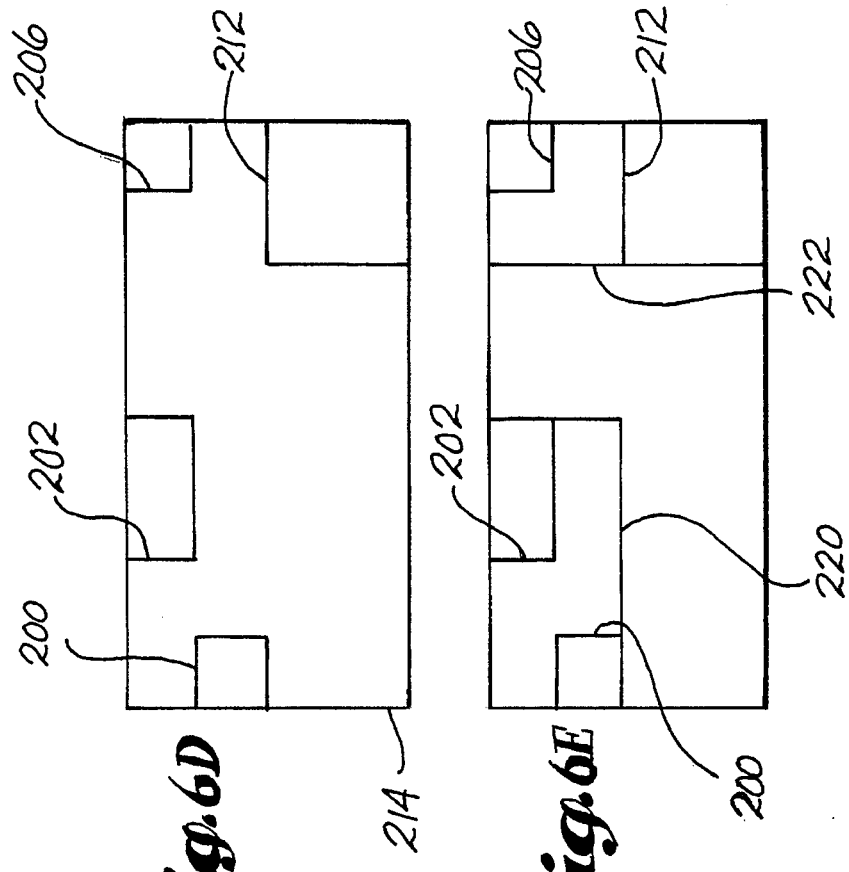
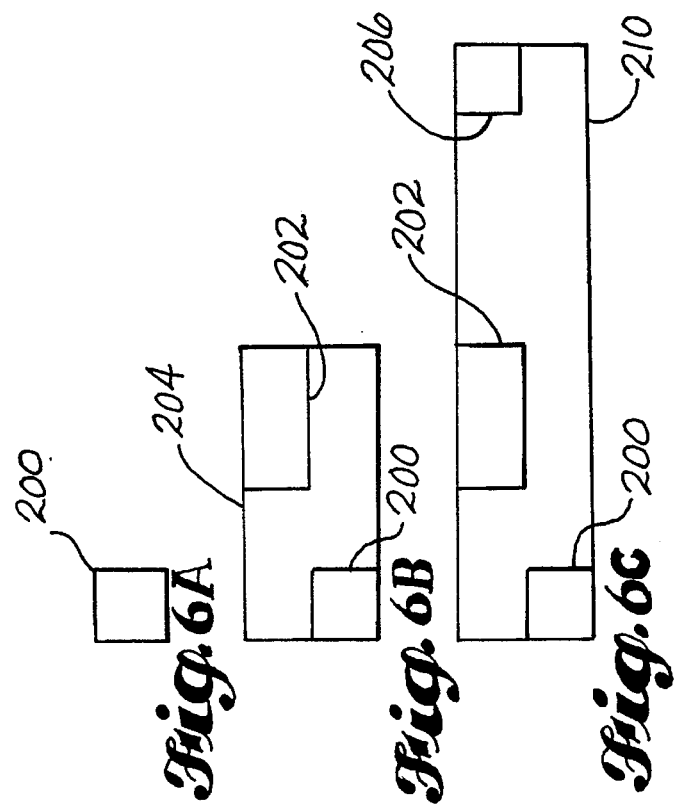

METHOD FOR CREATING SPATIALLY BALANCED BOUNDING VOLUME HIERARCHIES FOR USE IN A COMPUTER GENERATED DISPLAY OF A COMPLEX STRUCTURE

BACKGROUND OF THE INVENTION

The present invention relates to a method for computer image modeling of a complex structure and, in particular, to a method for creating a spatially balanced hierarchy of bounding volumes from an arbitrary distribution of parts for use as successive approximations thereof in a graphic display.

Interactive computer generated displays provide for the visualization of realistic looking, three-dimensional models. Such models, under user control, are useful for both design evaluation and training in virtual environments, as may be found, for example, in mechanical computerized design systems. Such computer visualization systems provide images of a three-dimensional, complex structure on the screen of a computer workstation as seen from a simulated observer's viewpoint under interactive control by the user. If the computer generated display can be rendered smoothly and quickly enough, the user is provided an illusion of real-time exploration of a virtual environment under simulated observer movement through the structure.

A particular application for an interactive, computer generated visualization system of a complex structure is found in the modeling of highly complex structure, such as aircraft. Here, a system which allows the user interactive movement throughout the structure can aid in numerous aspects related to the ultimate success of the product. For example, an interactive display of a complex aircraft structure can identify interference and fit problems, provide the ability to "see" areas of the product normally hidden in a physical mock-up, design routing of ducts and wiring through crowded areas, facilitate the work of integrated product teams by providing a "live" model and reduce cycle time and cost of the production of illustrations and training media. As computer graphic based systems have matured, so have the three-dimensional model data bases that its methods were meant to display. Because real world structure contains far more complexity than can reasonably be stored on computer storage media, the complexity of models developed has traditionally exceeded the capacity of the hardware required to display it. To deal with this problem, various methods have been developed to reduce the complexity of models while attempting to effect only minor changes on the perceived complexity to the eye. These methods may be divided into two categories: culling and detail elision.

Culling is the practice of not displaying objects that are invisible from the current viewing position. Such objects are considered "culled" from the scene. Objects may be culled either from being hidden by other objects or by being outside the current viewing frustum. While culling to the viewing frustum is often straightforward, culling occluded objects can be difficult, although numerous algorithms have been devised to solve this problem. The key to culling is having a fast method of determining the visibility of all objects in a scene.

Detail elision is the practice of displaying an object at a varying level of detail (LOD) depending on the object's importance to the perceived complexity of the scene. This perceived importance has traditionally been measured by the size of the object in screen picture elements (pixels). The key to using detail elision is to have several levels of detail available for all complex objects in the scene.

The use of bounding volume hierarchies is not new to computer graphics. The most common use is in the simplification of a variety of intersection problems, e.g., intersection with a viewing frustum for culling, intersection with other objects for collision detection, and intersection with rays for ray tracing.

A number of published methods are known in the art for generating a bounding volume hierarchy. One simple method is to have the bounding volume match the modeling hierarchy. Methods which do not depend on a known modeling hierarchy include a median-cut scheme which creates a binary tree based sorting by x, y, and z coordinates of objects, and an octree scheme which groups objects based on their clustering in octants.

None of the known methods in the an are capable of deriving a tight, well-balanced bounding volume hierarchy from an arbitrary ordering of objects. There is no useful modeling hierarchy known to the art because of the arbitrary ordering. Median-cut schemes work only with one dimension at a time, and therefore objects that are close in space may be distant from each other in the tree. An octree scheme holds promise, but does not provide a tight bounding volume for objects centered at octant boundaries, and leaves choosing which octants go together unspecified.

SUMMARY OF THE INVENTION

It is an object of the present invention, therefore, to provide a method for creating tight, spatially balanced hierarchies of bounding volumes from an arbitrary distribution of parts for use as successive approximations to the original parts and part assemblies for use in computer generated screen displays.

It is a particular object of the present invention to provide the above-described method which is particularly adapted for providing level of detail hierarchies for use in facilitating computer generated animation through a complex structure.

Briefly, according to the invention, a method is presented for processing an arbitrary collection of objects, represented by computer generated images thereof, into a hierarchy of bounding volumes, from a root volume bounding all objects, to sub-volumes bounding individual objects or assemblies thereof, for use as successive approximations to said objects in a computer generated display. The method comprises the steps of:

a) creating bounding volumes for each of said objects;

b) processing selected bounding volumes through a predetermined combining algorithm to determine whether or not, based upon a geometric relationship therebetween, the selected bounding volumes can be combined into a new volume representative of said selected volumes and, with respect to those bounding volumes which can be combined, c) creating a new bounding volume with said combined volumes comprising sub-volumes thereof, whereby the new bounding volume approximates the image of the sub-volumes.

In a further aspect of the invention, the step of processing selected bounding volumes through a predetermined combining algorithm comprises the steps of:

selecting at least two bounding volumes;

computing the combined volume of said selected bounding volumes;

determining whether said combined volume is smaller than a predetermined percentage of the volume of the root volume and:

a) if it is not, determining that said selected bounding volumes cannot be combined and not attempting to combine same; and b) if it is, determining that said selected bounding volumes can be combined.

In a further aspect of the invention, the above step of processing selected bounding volumes through a predetermined combining algorithm comprises the further step of:

in attempting to combine a new bounding volume into a parent volume which contains at least two sub-volumes:

determining whether adding the new bounding volume expands the parent volume and, if it does, determining that none of the previous parent sub-volumes can combine and not attempting to combine the same.

In yet a further aspect of the invention, the above step of processing selected bounding volumes through a predetermined combining algorithm comprises the further step of:

in attempting to combine sub-volumes contained within a parent volume:

determining if the smallest sub-volume is larger than said predetermined percentage of the volume of said parent volume and, if it is, determining that none of the parent's sub-volumes can combine and not attempting to combine same.

In yet a further aspect of the invention, the above-described step of processing selected bounding volumes through a predetermined combining algorithm comprises the further step of:

in attempting to combine a new bounding volume into a parent volume which contains at least two sub-volumes:

determining whether said new bounding volume can combine with one of said sub-volumes and, if it can, determining that the remaining sub-volumes are unlikely to combine and not attempting to combine same.

BRIEF DESCRIPTION OF THE DRAWINGS

FIG. 1 is an isometric view of an arbitrary, complex structure and depicts the manner by which the structure, in accordance with the present invention, is broken into its detailed parts for purposes of computer modeling and display;

FIG. 2 is an isometric view of one of the component parts of the complex structure set forth in FIG. 1 and illustrates the manner by which a bounding volume for the part is generated;

FIG. 5 is a cross-sectional view of an aircraft structure—a particular example of the type of complex structure for which the present invention is particularly adept at creating a computer model;

FIGS. 6A–6E are box diagrams illustrating the inventive approach for creating spatially balanced bounding volume hierarchies;

DETAILED DESCRIPTION

Figure 3C:
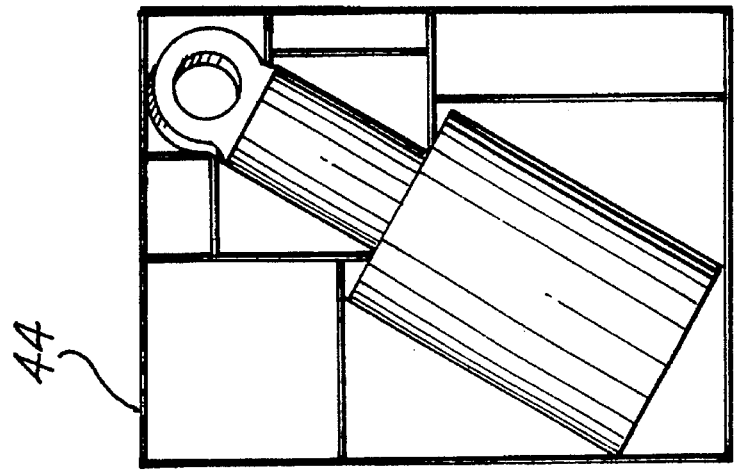
FIGS. 3A–3C are side, isometric views of the complex structure shown in FIG. 1 and further depicts the creation of computer generated bounding volumes.

The present invention is directed to a method for creating a tight, spatially balanced hierarchy of bounding volumes from an arbitrary distribution of parts, such as may be found in a complex structure, for use as successive approximations to the original parts and part assemblies in a computer generated graphic display. Thus, given digital datasets representing the components in a complex structure, the present invention is capable of generating various levels of detail representative of the complex structure and its component parts and subassemblies. The present invention would typically be used in association with a method for controlling the level of detail displayed in a computer generated screen display of a complex structure. A preferred method for controlling the level of detail in a computer generated screen display is set forth in copending patent application Ser. No. 08,329,355, dated Oct. 26, 1994, entitled "METHOD FOR CONTROLLING THE LEVEL OF DETAIL DISPLAYED IN A COMPUTER GENERATED SCREEN DISPLAY OF A COMPLEX STRUCTURE", invented by Eric L. Brechner and assigned to the same assignee as the present invention, which method is incorporated herein by reference.

The general approach taken by the present inventive method is to start with an empty tree and insert objects one at a time, growing the tree as necessary. The first step is to compute a bounding volume for the object being inserted. Then, the root volume, i.e., the volume which contains all parts, is expanded to fit the new volume tightly and the new volume is added to the root's children. Next, each child is compared with each of its siblings to see if they can combine. A pair can combine if the bounding volume that contains them is smaller than some fixed percentage of the parent volume. When a pair combine they are replaced by the box that contains them, and the process continues with their combined children.

FIG. 1 illustrates the basic method whereby a computer generated graphic representation of a complex structure can be broken down into its component parts and then, as is shown in FIGS. 2 through 4, modeled as bounding volumes.

Shown in FIG. 1 is an isometric view of an arbitrary, complex structure, here indicated generally at 12. This overall structure 12 may exist in digital format, as a dataset which may be generated by any of several well known CAD/CAM programs. (In the preferred embodiment of the invention, the datasets were generated by a CAD/CAM program known as CATIA, which is available under license from Dessault.) The modeling continues to break down the complex structure 12 from its all encompassing, root level to its branch levels including the cylinder 14 and an assembly, indicated generally at 16, including a shaft 18 which is connected to a cylindrical end connector 20. The assembly 16 is then broken down via further branches into its component parts of the shaft 18 and its cylindrical end connector 20. Thus, depicted in FIG. 1 is an inverted tree structure, with the basic root, containing all of the parts of the complex structure at the top, which is further broken down into various branches depicting sub-assemblies and ultimately, the detailed parts themselves as the leaves.

To provide level of detail for the complex structure, the root, branch and leaf levels are further modeled using bounding volumes, as is shown in FIG. 2. Here, the cylindrical end connector 20 is modeled via its bounding volume comprised of eight cornered box 22. Eight cornered box 22 is designed to be the smallest axially-aligned box which fully contains the end connector 20. This eight cornered box is stored by the computer as a quick model for the cylindrical end connector 20. Less computer memory is required to store the box 22 than is required for storage of the complete cylindrical end connector 20. As such, in applications wherein the user can interactively move throughout a complex structure, thereby requiring high demands on computer speed and memory, it might be acceptable to display the bounding box volume 22 in place of the detailed cylindrical end connector 20 itself.

Figure 3B:
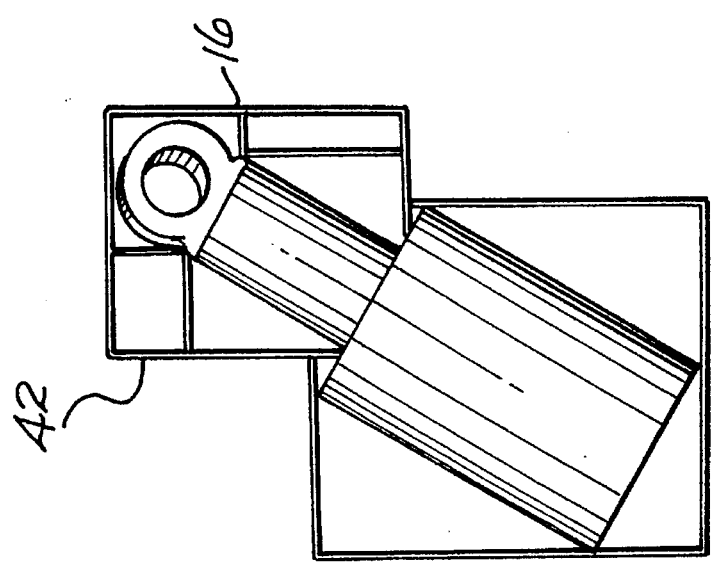
Figure 3A:
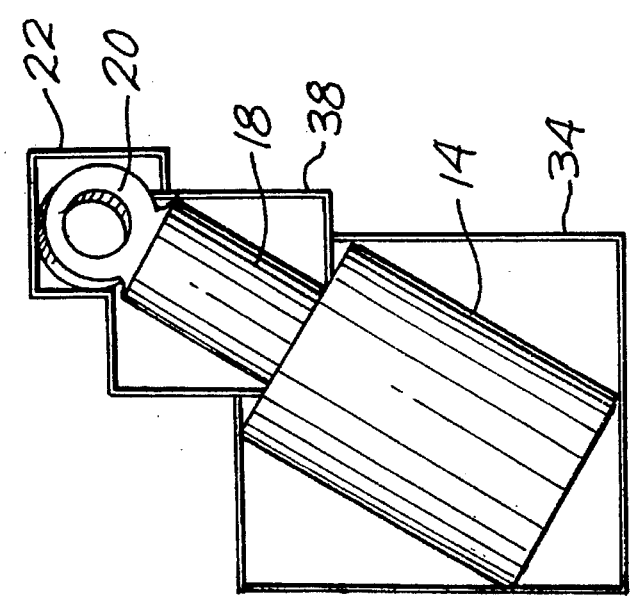

In fact, as is shown in FIGS. 3A–3C, bounding volumes are created for the entire complex structure 12. Thus, referring to FIG. 3A, shown is a box type bounding volume 34 for cylinder 14, a box type bounding volume 38 for connecting shaft 18 and the afore-described bounding volume 22 for the cylindrical end connector 20.

Further levels of detail with respect to the bounding volumes are possible. Note that in FIG. 1, the subassembly 16 is comprised of cylindrical end connector 20 which is connected to the shaft 18. Thus, in FIG. 3B, a branch bounding volume 42 is formed about the sub-assembly 16.

Finally, in FIG. 3C, a yet further bounding volume 44 is formed about the entire structure 12. Thus, at the lowest level of detail, the bounding volume 44 may be displayed whereas in the highest level of detail prior to depiction of the actual part 12 itself, the bounding volumes 22, 38 and 34 may be displayed.

Figure 4A:
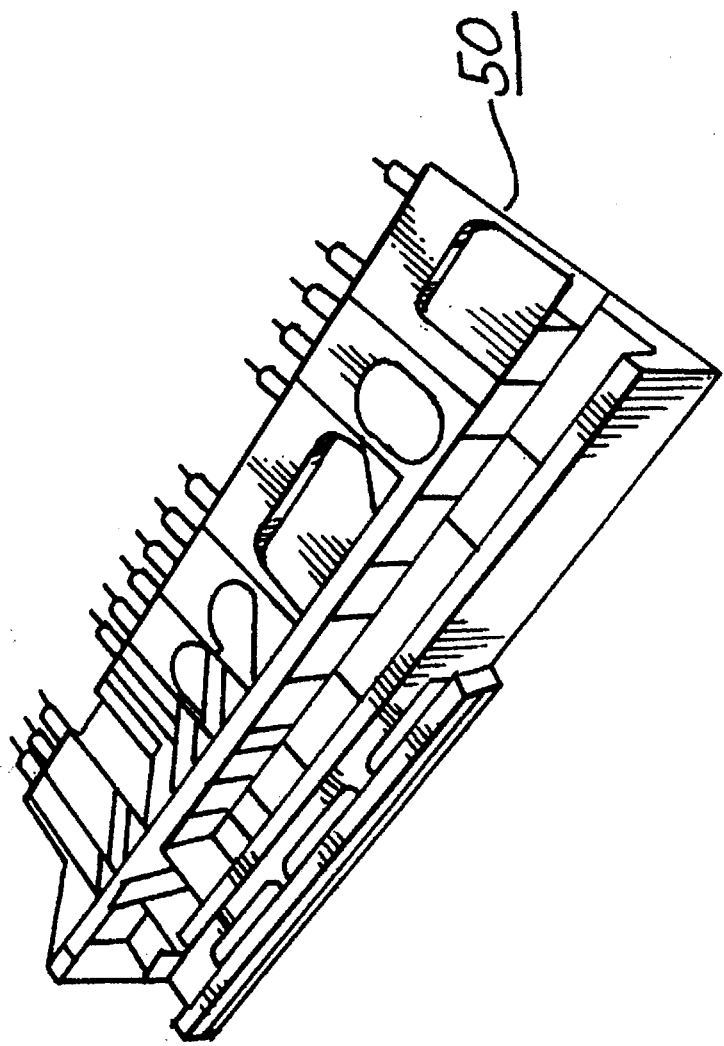
FIGS. 4A–4C illustrates an extremely complex mechanical assembly and depict the varying levels of detail provided in the computer model bounding volume hierarchies therefor.
Figure 4B:
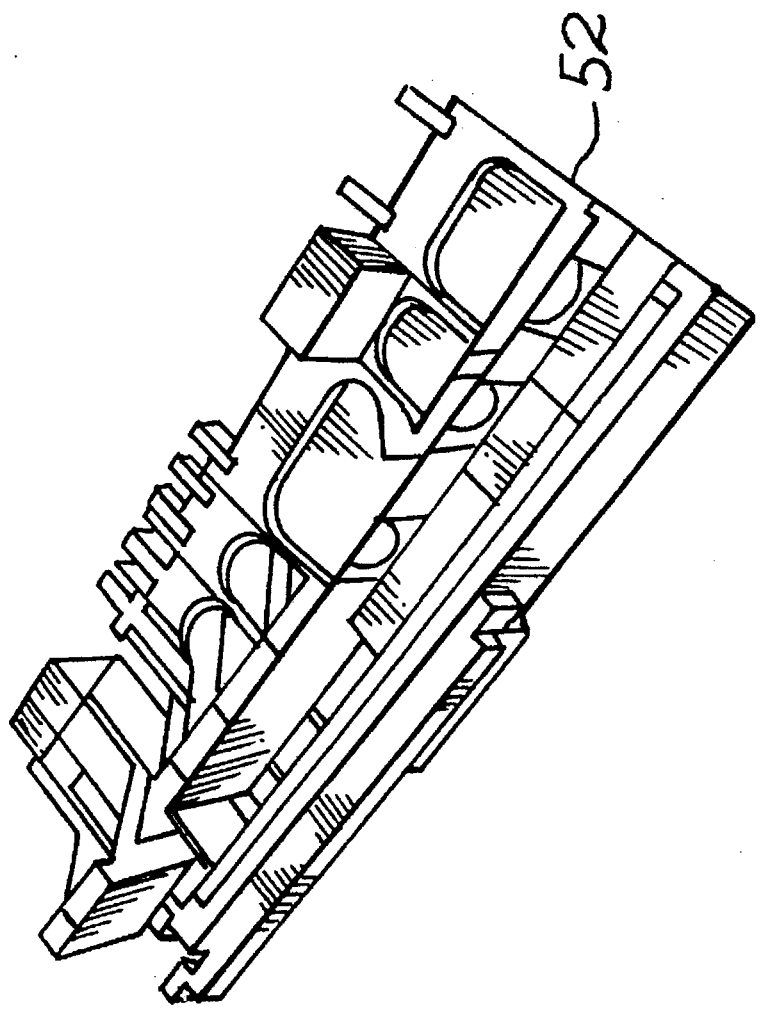
Figure 4C:
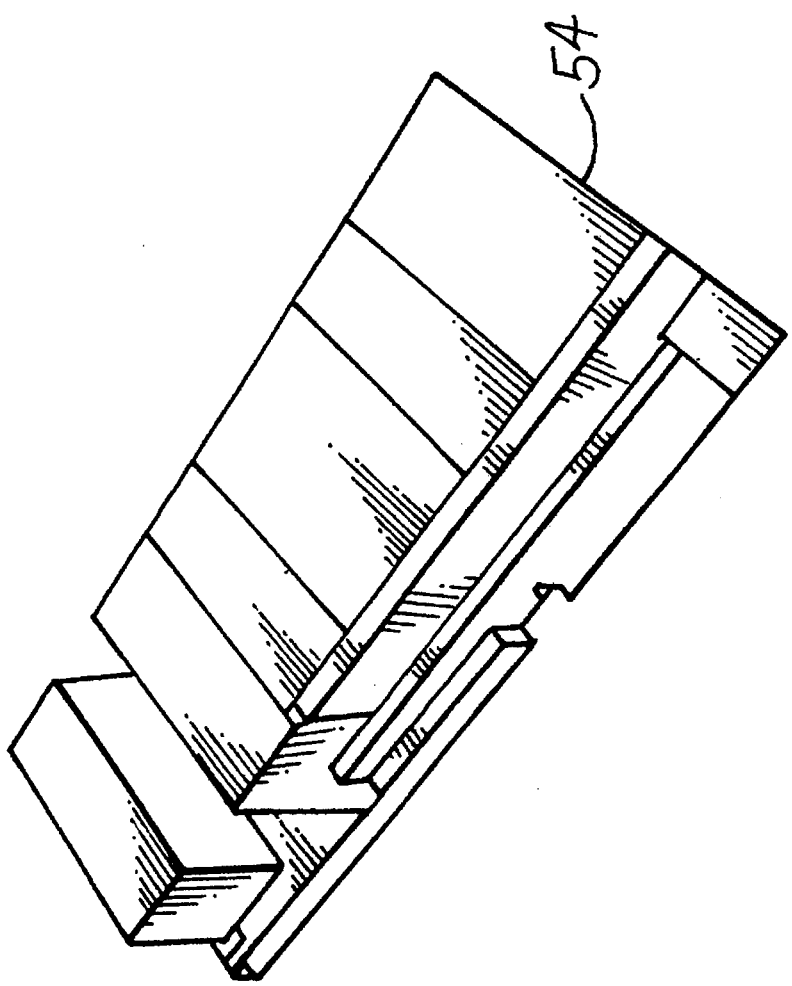

A computer generated depiction of an actual, complex part is set forth in FIGS. 4A–4C.

FIG. 4A illustrates a highly complex assembly 50 comprised of numerous individual parts. Here, the assembly 50 is depicted at the part-level (i.e., highest level of detail).

In accordance with the present invention, the detailed part in FIG. 4A can be modeled to create a tight, spatially balanced hierarchy of bounding volumes, to thereby reduce computing time and computer memory required to display a given part. Thus, FIG. 4B depicts a lower level of detail, here resorting to the first level of bounding volumes for the detailed assembly 50 of FIG. 4A. Note that the complex structure 50 has been modeled by various bounding volumes as shown in the display 52. To a user who is interactively moving throughout an overall structure which includes assembly 50, the display of 52 definitely suggests the detailed part and, yet, by the use of bounding volumes, far less computer speed and/or computer memory is required to depict the graphics of display 52.

FIG. 4C illustrates yet a further, lower level of detail in the computer generated representation 54 of the assembly 50. Here, while the general outline of the assembly 50 is depicted, individual structure is not discernible. The display 54 is, therefore, even less demanding on computer speed and memory.

FIG. 5 is a cross-sectional view of a commercial aircraft, indicated generally at 100, and illustrates a practical application for use in the bounding volume hierarchy of the present invention.

The aircraft structure 100 is comprised of a generally circular outer skin 102 with an interior sidewall 104. Within the structure is the horizontal floor 106 shown supporting two side seat pairs 108, 110 and a central seating triple 112. Overhead of the side seat pairs 108, 110 are storage bins 114, 116, respectively. Overhead of the central seating triple is ceiling structure 120, electrical sign 122 and a storage bin 124.

Numerous structures are routed beneath the floor 106. This includes, for illustrative purposes, a potable water line 130, which is supported by a water line support bracket 132. Also provided are electrical lines 134, which provide power throughout the aircraft, and a waste duct 136.

Routed above the ceiling 120 and storage bins 124 is a duct containing flight control lines 150, a series of electrical wire bundles 152, 154 and galley overhead ties and brackets 160, 162. While countless other structures are included within a typical aircraft cross-section, the highly complex nature of the overall structure 100 is apparent.

The present invention finds application in an interactive visualization of the aircraft structure 100 wherein, sitting at a workstation, an operator can select to change his or her perspective and move throughout the aircraft. Due to the high number of detailed parts in an aircraft structure, and to the effects of culling and detail elision described above, the demands for computer speed and memory to depict all of the aircraft structure within the viewing frustum are extraordinary. As such, it is desirable to reduce, or model the parts via the level of detail described with respect to FIGS. 1–4 to allow a user to get a genuine sense of movement throughout the aircraft and yet be within reasonable constraints of computer speed and memory.

FIGS. 6A–6E illustrate the basic approach taken by the present inventive method to create a spatially balanced bounding volume hierarchy for a complex structure. As is depicted in FIGS. 1–4, bounding volumes are first created for each part and part assembly of the complex structure. In FIG. 6A, the bounding volume for a first bounding volume box 200 is selected.

In FIG. 6B, a second, wider box 202 is added, thereby expanding a parent bounding volume 204 to contain each of its sub-volumes 200, 202. Note that the parent volume is the smallest box capable of bounding sub-volumes 200, 202.

Next, a combining algorithm is used to determine whether or not sub-volumes 200, 202 can combine. The preferred combining algorithm determines the total volume (or area in the 2-dimensional example of FIG. 6) of the combination of the children and compare this volume (or area) to the volume (area) of the parent. If the combined volume of the children is less than a predetermined percentage of the volume of the parent, the sub-volume pair can combine. Otherwise, they do not combine.

Returning to FIG. 6B, the children 200, 202 of the parent 204 cannot combine because the volume (area) of the combination of the children is the same as that of the entire parent.

In FIG. 6C, another, small bounding volume box 206 is added, expanding the parent 210 even further. This time, the first two sub-volumes 200, 202 might combine if the combining algorithm predetermined percentage were set to 50% of the parent. However, for this example, a value of 25% is assumed. Therefore, no sub-volumes 200, 202, or 206 can combine.

In FIG. 6D, a larger bounding volume box 212 is now inserted into the lower right, thereby expanding the parent 214 downward. Now, with reference to FIG. 6E, assuming the combining algorithm uses a reference percentage of 25%, the first two sub-volumes 200, 202 may be combined into the sub-volume 220 and the third and fourth sub-volumes 206, 212 can be combined into a sub-volume 222. The result is a hierarchy of a bounding volumes 3 deep and 2 wide at each level, thereby providing three levels of detail for every object.

Note that there are various other combinations of the bounding volume boxes that could also pair up, like the combination of the two top boxes 202, 206, but once a pair is made, no other possible pairings are considered in this, the preferred embodiment of the present method.

It is significant that the percentage of current volume comparison which is accomplished by the combining algorithm is dimensionless and somewhat independent of shape. In fact, any invariant geometric measure, like surface area or perimeter, works in the combination criteria, but the volume measure, in practice, gives the most satisfying results. The smaller the percentage, the wider the tree and the larger the percentage, the deeper the tree. In this, the preferred embodiment of the invention, the predetermined threshold percentage was selected as 8.3% or 1/12.

Figure 7A:
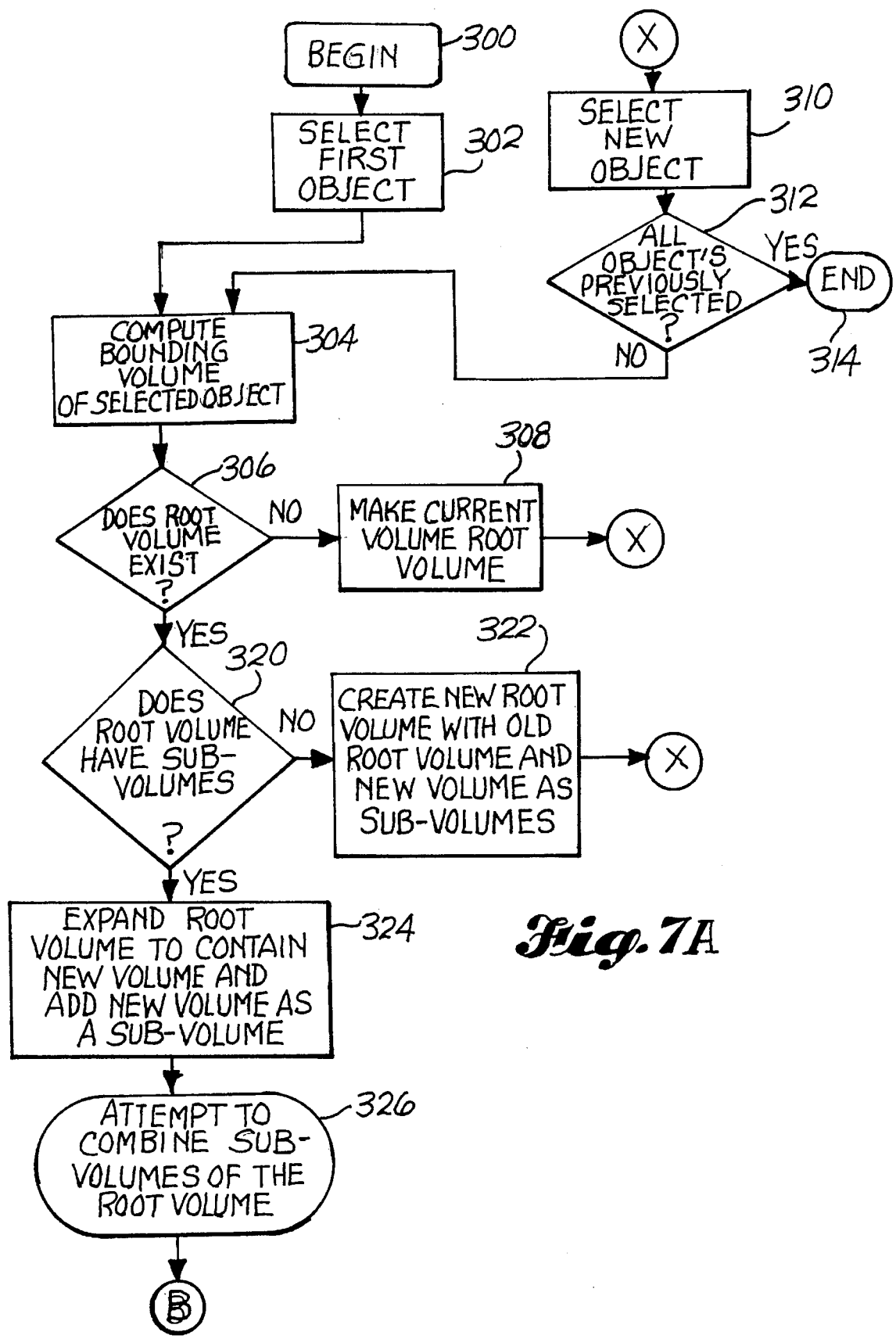
FIG. 7A, 7B are detailed logic flow diagrams illustrating the preferred method for creating the spatially balanced bounding volume hierarchies.
Figure 7B:
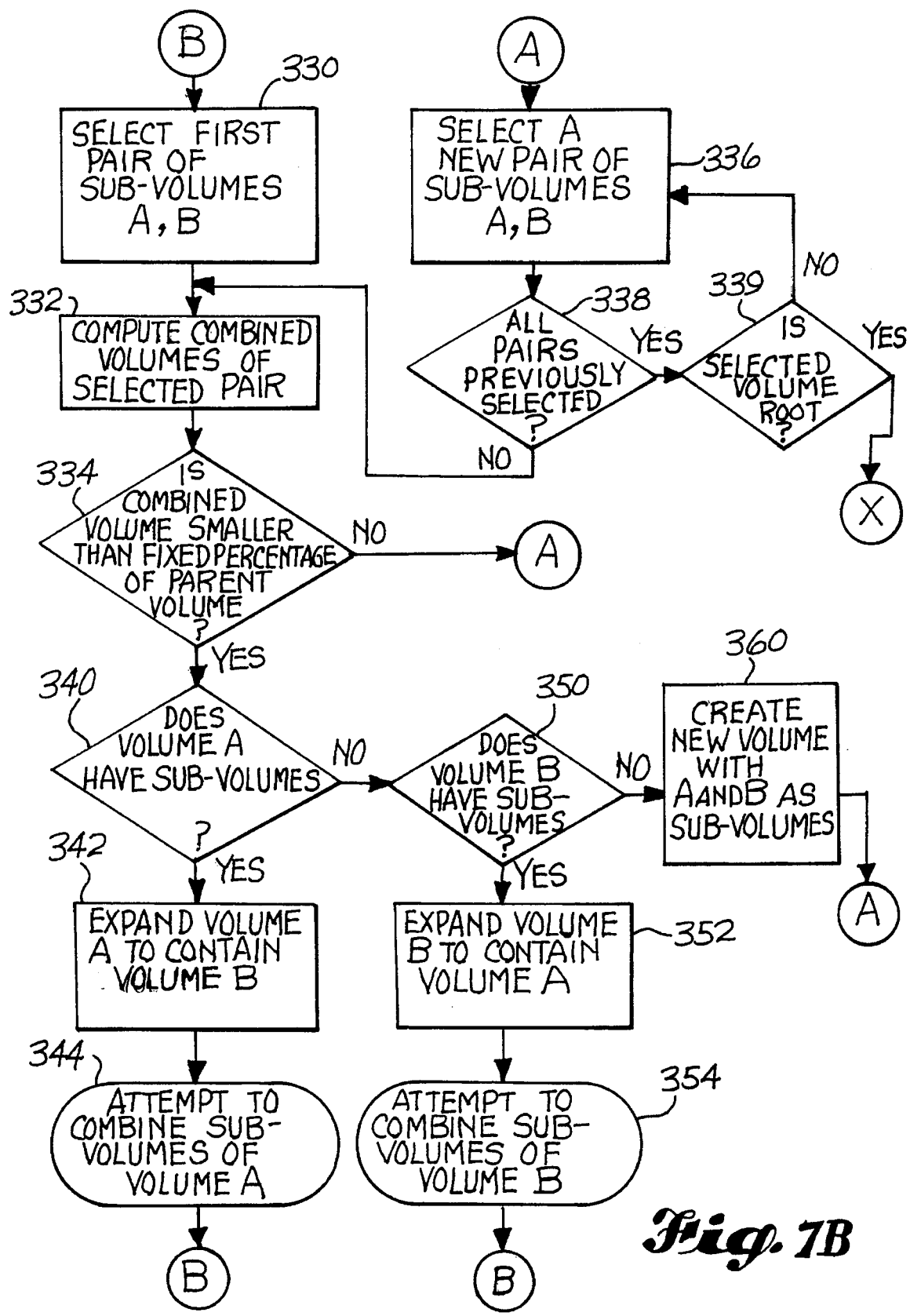

FIGS. 7A, 7B are detailed logic flow diagrams setting forth a preferred method for creating the spatially balanced bounding hierarchies for use in a computer generated display of a complex structure.

The method begins at step 300. Next, at step 302 the first of the many objects to be modeled is selected. In step 304 a bounding volume is computed for the selected object. As described herein above, the bounding volume may be formed as the smallest axially-aligned 8 cornered box which contains the selected object.

The method then enters step 306 where a determination is made as to whether or not the root, or highest level volume, currently exists. Since this is the first selected object, no root volume exists and step 308 is entered at which point the current selected volume is defined as the root volume.

The process then continues to step 310 at which point a new object is selected. A test is made at step 312 to determine whether or not all objects have been selected. If all have been selected, the modeling ends at the end step 314. If all objects have not already been selected, the newly selected object is passed to step 304 for the creation of its bounding volume. Now, at step 306, a root volume does exist, and the method enters step 320 to determine whether or not the root volume has sub-volumes. If the root volume does not contain sub-volumes, step 322 is entered and a new root volume is created which contains the old root volume and the newly selected volume as sub-volumes thereof. The method then returns to step 310 to select a new object.

If, at step 320, it is determined that the root volume does have sub-volumes, step 324 is entered and the root volume is expanded to contain the new volume and add the new volume as a sub-volume thereof.

Following step 324, the method enters a routine to attempt to combine the sub-volumes of the root volume, as depicted in step 326. Now, step 330 is entered and a first pair of sub-volumes A, B within the root volume is selected.

The method continues at step 332 to compute the combined volume of the selected pair A, B.

At step 334 the combining algorithm is entered. Here, a determination is made as to whether or not the combined volume of selected pair A, B is smaller than a fixed percentage of the parent volume. If it is not smaller, the method advances to step 336 to select a new pair of sub-volumes A, B.

A test at step 338 determines whether or not all pairs of sub-volumes have been previously selected. If they have, the test is "yes" and the system performs a test at step 339 to determine if the selected volume is the root. If it is not the root volume, the system returns to step 336 to select a new sub-volume pair. If the selected volume is the root volume, the system returns to step 310 to select a new object.

If, out of test step 338, all pairs have not been previously selected, the answer is "no" and the newly selected pair of sub-volumes is passed to step 332 to compute the combined volume.

Step 332 is then again followed by the combining algorithm of 334. If, at step 334, it is determined that the combined volume of the selected sub-volume pair is smaller than the predetermined, fixed percentage of the parent volume, the test answer is "yes" and step 340 is entered. Here, a test is done to determine whether or not volume A has sub-volumes. If volume A does have sub-volumes, the test answer is "yes" and step 342 is entered in which the volume A is expanded to obtain volume B.

Following step 342, an attempt to combine the sub-volumes of volume A is made at 344 whereby the system returns to select a first pair of sub-volumes A, B in accordance with step 330.

Returning to step 340, if it is determined that volume A does not have sub-volumes, step 350 is entered.

At step 350, a determination is made as to whether or not volume B has sub-volumes. If it does, the method increments to step 352 and the volume B is expanded to contain volume A.

Following step 352, an attempt is made in step 354 to combine the sub-volumes of volume B by returning to step 330 which selects a first pair of sub-volumes A, B.

Returning to the test of step 350, if it is determined that volume B does not have sub-volumes, a step 360 is entered whereby a new volume is created with volumes A and B as contained sub-volumes thereof.

The method then returns to step 336 to select a new pair of sub-volumes A and B.

Thus, in accordance with the detailed logic flow diagram set forth in FIGS. 7A, 7B, each of the various parts of a complex structure is systematically converted to a bounding volume and then processed to determine a tight, spatially balanced bounding volume hierarchy which successively represents the original parts and sub-assemblies thereof, until the entire complex structure is converted to a bounding volume hierarchy.

The bounding volume hierarchy creation as described above can be further improved by certain speed increasing enhancements.

For example, although it is always necessary to compare the newly inserted volume to the other children of a parent, it may not be necessary to compare the other siblings to each other. In particular, if inserting the new volume does not expand the parent volume, then one can expect that none of the older children can combine.

In addition, if the smallest child is larger than the predetermined fixed percentage of the parent, then combining children would only make them bigger and, therefore, none of the older children can combine.

In practice, children that are larger than 1/10 of the predetermined fixed percentage of the parent do not commonly combine and may be ignored for efficiency.

In addition, if a new volume can combine with an older child, then it must have been close to that child and, therefore, must not have expanded the parent by a large margin. This means that the other older siblings are unlikely to combine.

Figure 8A:
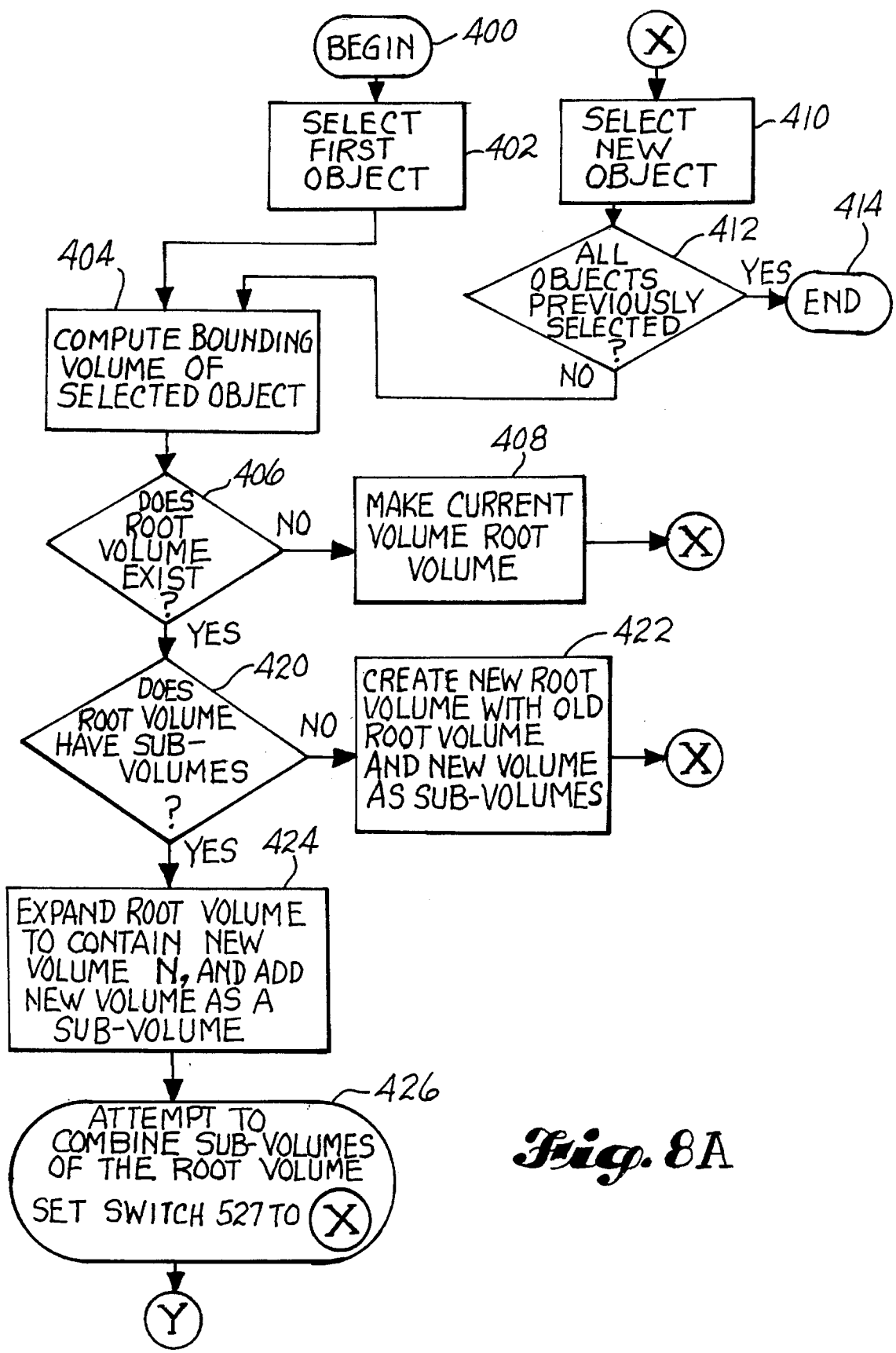
FIGS. 8A–8C are detailed logic flow diagram illustrating a preferred method for creating spatially balanced bounding volume hierarchies which incorporate speed enhancements to reduce computing time.
Figure 8B:
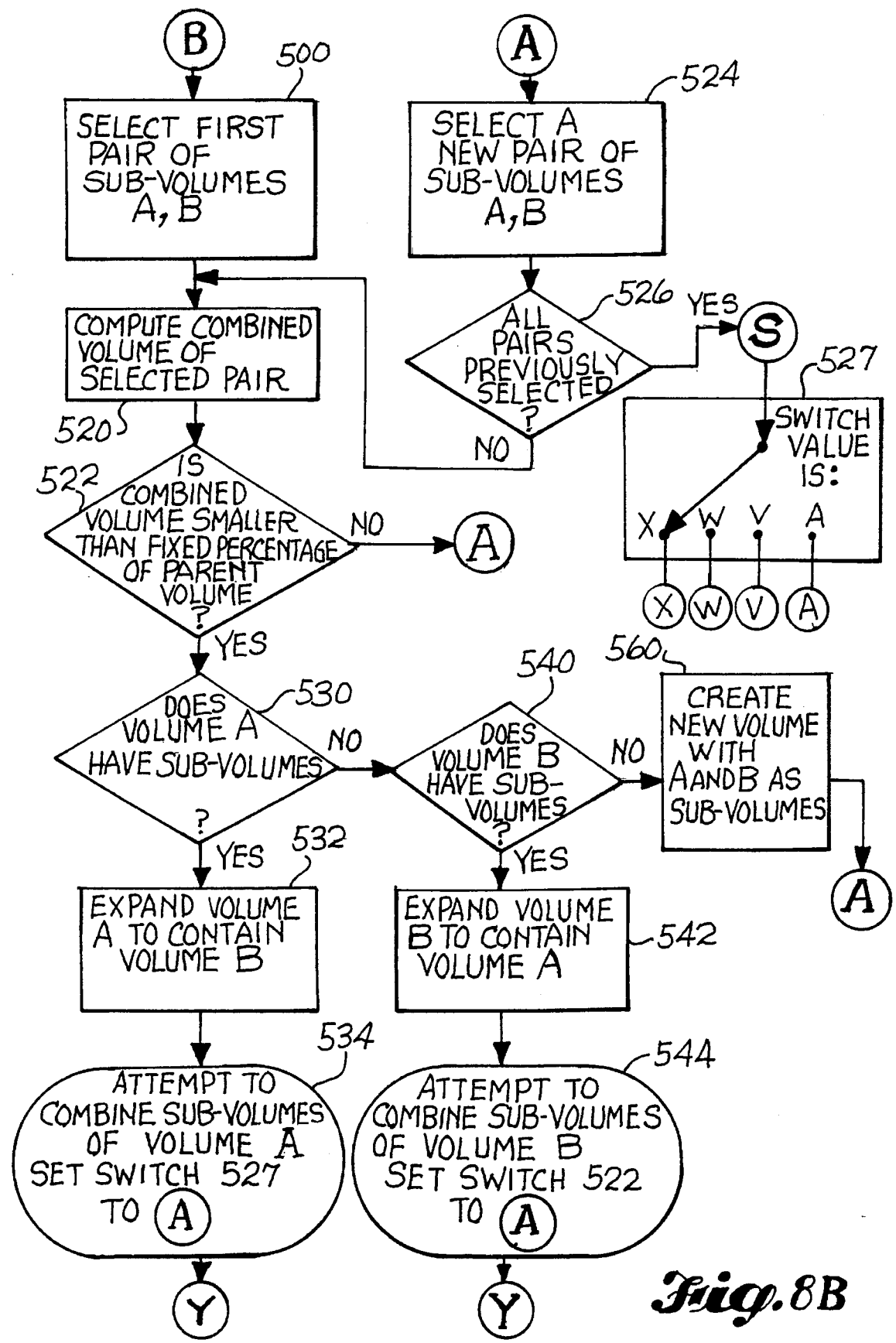
Figure 8C:
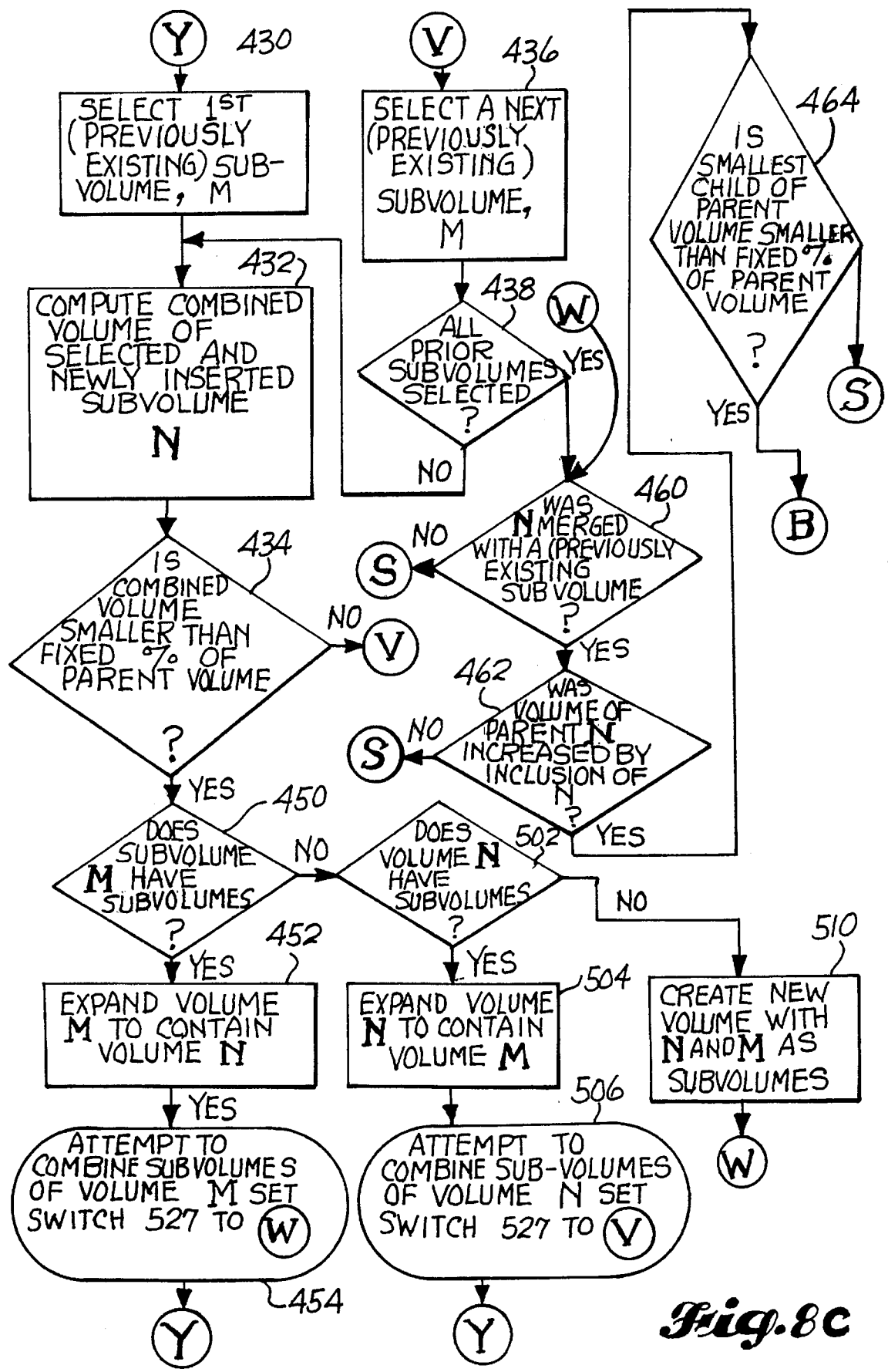

These above described enhancements can be incorporated within the inventive method as is understood with respect to FIGS. 8A–8C.

Referring to FIG. 8A, the enhanced bounding volume hierarchy is entered at begin step 400. A first object of the complex structure is selected at step 402. At step 404 the bounding volume of the selected object is computed. A test is made at step 406 to determine whether or not the root volume exists. If it does not, at step 408, the present selected volume is made the root volume.

The method then continues at step 410 to select a new object. If, at step 412, all objects have been previously selected, the end step is reached at 414. However, if step 412 indicates that all objects have not been previously selected, the newly selected object is then passed through steps 404 and 406.

Following step 406, a test is made at 420 to determine whether or not the root volume contains sub-volumes. If it does not, step 422 is entered and a new root volume is created having the old root volume and the new selected volume as sub-volumes. The method then increments back to step 410 to select a new object.

If, at step 420, it is determined that the root volume has sub-volumes, step 424 is entered and the root volume is expanded to contain the new volume N and add the new volume as a sub-volume thereof.

The process then continues at step 426 to attempt to combine the sub-volumes of the root volume.

This attempted combination begins (FIG. 8C) with step 430 at which a first, previously existing sub-volume M is selected.

Next, at step 432, the combined volume of the selected and newly inserted sub-volume N is computed.

Following step 432, at step 434 a determination is made as to whether or not the combined sub-volume is smaller than a predetermined fixed percentage of the parent volume. If it is not, step 436 is entered and a next, previously existing sub-volume M is selected. This is followed by a test at step 438 to determine whether or not all prior sub-volumes have been selected. If all prior sub-volumes have not been selected, the method continues to step 432 to compute the combined volume of the selected and newly inserted sub-volumes, N.

Step 432 is followed, as before, by step 434 wherein it is determined whether or not the combined volume from step 432 is smaller than a predetermined fixed percentage of the parent volume. Now, if it is smaller, step 450 is entered wherein it is determine whether or not sub-volume M has sub-volumes. If the sub-volume M has sub-volumes, step 452 is entered and the volume M is expanded to contain the volume N. The method then proceeds to step 454 to attempt to combine the sub-volumes of M, with switch 527 being set to the "W" position. This subroutine is followed by entering the test step 460 to determine whether or not N has been merged with a previously existing sub-volume. Test step 460 is also entered if the test at step 438 indicates that all prior sub-volumes have been selected.

If the test at step 460 indicates that the volume N had not been merged with the previously existing sub-volume, the method proceeds through to switch 527.

However, if at test step 460 it is determined that N had been merged with a previously, existing sub-volume, the test at step 462 is entered. Here, it is determined whether or not the volume of the parent of volume N is increased by the inclusion of sub-volume N. If it is not increased, the method returns to switch 527.

However, if at step 462 it is determined that the parent of N is increased by inclusion of sub-volume N, step 464 is entered. At step 464 it is determined whether or not the smallest child of the parent volume is smaller than the predetermined fixed percentage of the parent volume. If it is not smaller, the system proceeds to switch 527. However, if it is smaller than the predetermined fixed percentage, the method increments to step 500 at which point a first pair of sub-volumes A, B is selected.

Returning to the test at step 450, if it is determined that the sub-volume N does not have sub-volumes, a test step 502 is entered at which point it is determined whether or not volume N has sub-volumes. If volume N does have sub-volumes, step 504 is entered and the volume N is expanded to contain the volume M. This is followed by step 506 at which point an attempted combination of the sub-volumes of volume N is made. This proceeds through the process beginning with step 430 and switch 527 is set to the "V" position.

If the test at 502 indicates that the volume IN does not have sub-volumes, step 510 is entered and a new volume with N and M as sub-volumes is created, with the method then reverting to step 460.

Returning to step 500, if first pair of sub-volumes A, B is selected, the process then enters step 520 to compute the combined volume of the selected pair A, B.

At step 522, it is determined whether or not the combined volume from step 520 is smaller than a fixed predetermined percentage of the parent volume. If it is not smaller, the system increments to step 524, at which point a new pair of sub-volumes A, B is selected.

Following step 524, a test at step 526 determines whether or not all pairs have been previously selected. If they have, the system proceeds to a switch function 527. Switch 527 routes logic flow from its input to one of four output logic directions X, W, V and A. The position of switch 527, here shown in the "X" position, is determined by system commands as described herein. Here, with the switch 527 in the "X" position the process returns to step 410 to select a new object. If, however, all pairs have not been previously selected, the new selected pair is passed to step 520 wherein the combined volume of the selected pair is computed.

Step 520 is followed, as described before, by step 522 wherein it is determined whether or not the combined volume computed in step 520 is smaller than a predetermined, fixed percentage of the current volume. If it is not smaller, the system increments to step 524 and selects a new pair of sub-volumes A, B.

If, however, at step 522 it is determined that the combined volume is smaller than the predetermined fixed percentage of the parent volume, step 530 is entered. At step 530, a determination is made as to whether or not volume A has sub-volumes. If volume A does have sub-volumes, the process increments to step 532 wherein volume A is expanded to contain volume B. The method then continues at step 534 to attempt to combine the sub-volumes of volume A thereby entering step 430 to select the first, previously existing, sub-volume M. Also, switch 527 is set to the "A" position.

However, if it is determined at step 530 that volume A does not have sub-volumes, step 540 is entered. In step 540, a determination is made as to whether or not volume B has sub-volumes. If volume B does have sub-volumes, the system increments to step 542 in which volume B is expanded to contain volume A. The method then increments to step 544 and attempts to combine the sub-volumes of volume B by proceeding to step 430 and selecting the first, previously existing sub-volume, M. Also, switch 527 is set to the "A" position.

If the test at step 540 indicates that volume B does not have sub-volumes, step 560 is entered and a new volume is created having volumes A and B as sub-volumes thereof. The method then returns to step 524 to select a new pair of sub-volumes A, B.

Thus, it will be understood that the detailed logic flow as set forth in FIGS. 8A–8C contains numerous speed enhancements over the detailed process set forth with respect to FIG. 7A, 7B.

In summary, a preferred method for creating tight, spatially balanced bounding volume hierarchies for use in a computer generated display of a complex structure has been described in detail.

Whereas a preferred embodiment of the invention has been described in detail, it should be apparent that many modifications and variations thereto are possible, all of which fall within the true spirit and scope of the invention.

For example, although the preferred embodiment depicts a particular methodology for creating bounding volumes for individual objects, in particular, by modeling individual parts or sub-assemblies thereof as bounding boxes, it should be apparent that the inventive method described in claim herein is adapted for use with any bounding volume methodology.

We claim:

1. A method for processing an arbitrary collection of objects, represented by computer generated images thereof, into a hierarchy of bounding volumes, from a root volume bounding all objects, to sub-volumes bounding individual objects or assemblies thereof, for use as successive approximations to said objects, comprising the steps of:
a) creating bounding volumes for said objects;
b) processing selected bounding volumes through a predetermined combining algorithm to determine whether or not, based upon a geometric relationship between said bounding volumes and the root volume, the selected bounding volumes can be combined into a new volume representative of said selected bounding volumes, and with respect to those bounding volumes which can be combined:
c) creating a new bounding volume with said combined bounding volumes comprising sub-volumes thereof,
d) recursively applying steps b) and c) to said new bounding volume and treating the new bounding volume as the root volume and its combined volumes as the selected volumes,
e) utilizing said new bounding volume as an approximation of the image of said sub-volumes in a computer generated display.

2. The method of claim 1 wherein the step of processing selected bounding volumes through a predetermined combining algorithm comprises the steps of:
selecting at least two bounding volumes;
computing the combined volume of said selected bounding volumes;
determining whether said combined volume is smaller than a predetermined percentage of the volume of the root volume and:
 a) if it is not, determining that said selected bounding volumes cannot be combined and not attempting to combine same, and
 b) if it is, determining that said selected bounding can be combined.

3. The method of claim 2 wherein said predetermined percentage is selected as approximately 8.3%.

4. The method of claim 2 wherein the step of processing selected bounding volumes through a predetermined combining algorithm comprises the first step of:

before attempting to combine a new bounding volume into a parent volume which contains at least two sub-volumes, determining whether adding the new bounding volume would expand the parent volume and, if it would not, determining that none of the parent's sub-volumes can combine and not attempting to combine same.

5. The method of claim 2 wherein the step of processing selected bounding volumes through a predetermined combining algorithm comprises the further step of:
before attempting to combine sub-volumes contained within a parent volume,
determining if the smallest sub-volume is larger than said predetermined percentage of the volume of said parent volume and, if it is, determining that none of the parent's sub-volumes can combine and not attempting to combine same.

6. The method of claim 5 wherein the step of processing selected bounding volumes through a predetermined combining algorithm comprises the further step of:
identifying each sub-volume having a volume greater than one-tenth of said predetermined percentage of the parent volume and not attempting to combine same.

7. The method of claim 3 wherein the step of processing selected bounding volumes through a predetermined combining algorithm comprises the further step of:
before attempting to combine sub-volumes contained within a parent volume,
determining if the smallest sub-volume is larger than said predetermined percentage of the volume of said parent volume and, if it is, determining that none of the parent's sub-volumes can combine and not attempting to combine same.

8. The method of claim 7 wherein the step of processing selected bounding volumes through a predetermined combining algorithm comprises the further step of:
identifying each sub-volume having a volume greater than one-tenth of said predetermined percentage of the parent volume and not attempting to combine same.

9. The method of claim 4 wherein the step of processing selected bounding volumes through a predetermined combining algorithm comprises the further step of:
before attempting to combine sub-volumes contained within a parent volume,
determining if the smallest sub-volume is larger than said predetermined percentage of the volume of said parent volume and, if it is, determining that none of the parent's sub-volumes can combine and not attempting to combine same.

10. The method of claim 9 wherein the step of processing selected bounding volumes through a predetermined combining algorithm comprises the further step of:
identifying each sub-volume having a volume greater than one-tenth of said predetermined percentage of the parent volume and not attempting to combine same.

11. The method of claim 1 wherein the step of processing selected bounding volumes through a predetermined combining algorithm comprises the further step of:
before attempting to combine a new bounding volume into a parent volume which contains at least two sub-volumes, determining whether said new bounding volume can combine with one of said sub-volumes and, if it can, determining that the remaining sub-volumes are unlikely to combine and not attempting to combine same.

12. The method of claim 2 wherein the step of processing selected bounding volumes through a predetermined combining algorithm comprises the further step of:
before attempting to combine a new bounding volume into a parent volume which contains at least two sub-volumes, determining whether said new bounding volume can combine with one of said sub-volumes and, if it can, determining that the remaining sub-volumes are unlikely to combine and not attempting to combine same.

13. The method of claim 3 wherein the step of processing selected bounding volumes through a predetermined combining algorithm comprises the further step of:
in attempting to combine a new bounding volume into a parent volume which contains at least two sub-volumes, determining whether said new bounding volume can combine with one of said sub-volumes and, if it can, determining that the remaining sub-volumes are unlikely to combine and not attempting to combine same.

14. The method of claim 4 wherein the step of processing selected bounding volumes through a predetermined combining algorithm comprises the further step of:
in attempting to combine a new bounding volume into a parent volume which contains at least two sub-volumes, determining whether said new bounding volume can combine with one of said sub-volumes and, if it can, determining that the remaining sub-volumes are unlikely to combine and not attempting to combine same.

15. The method of claim 5 wherein the step of processing selected bounding volumes through a predetermined combining algorithm comprises the further step of:
in attempting to combine a new bounding volume into a parent volume which contains at least two sub-volumes, determining whether said new bounding volume can combine with one of said sub-volumes and, if it can, determining that the remaining sub-volumes are unlikely to combine and not attempting to combine same.

16. The method of claim 6 wherein the step of processing selected bounding volumes through a predetermined combining algorithm comprises the further step of:
in attempting to combine a new bounding volume into a parent volume which contains at least two sub-volumes, determining whether said new bounding volume can combine with one of said sub-volumes and, if it can, determining that the remaining sub-volumes are unlikely to combine and not attempting to combine same.

17. The method of claim 7 wherein the step of processing selected bounding volumes through a predetermined combining algorithm comprises the further step of:
in attempting to combine a new bounding volume into a parent volume which contains at least two sub-volumes, determining whether said new bounding volume can combine with one of said sub-volumes and, if it can, determining that the remaining sub-volumes are unlikely to combine and not attempting to combine same.

18. The method of claim 8 wherein the step of processing selected bounding volumes through a predetermined combining algorithm comprises the further step of:
in attempting to combine a new bounding volume into a parent volume which contains at least two sub-volumes, determining whether said new bounding volume can combine with one of said sub-volumes and, if it can, determining that the remaining sub-volumes are unlikely to combine and not attempting to combine same.

19. The method of claim 9 wherein the step of processing selected bounding volumes through a predetermined combining algorithm comprises the further step of:
in attempting to combine a new bounding volume into a parent volume which contains at least two sub-volumes, determining whether said new bounding volume can combine with one of said sub-volumes and, if it can, determining that the remaining sub-volumes are unlikely to combine and not attempting to combine same.

20. The method of claim 10 wherein the step of processing selected bounding volumes through a predetermined combining algorithm comprises the further step of:
in attempting to combine a new bounding volume into a parent volume which contains at least two sub-volumes, determining whether said new bounding volume can combine with one of said sub-volumes and, if it can, determining that the remaining sub-volumes are unlikely to combine and not attempting to combine same.

21. A method for creating a tight, spatially balanced hierarchy of bounding volumes from an arbitrary distribution of parts for use as successive approximations to the original parts and part assemblies, comprising the steps of:
a) selecting a first part;
b) computing a first bounding volume for said first part;
c) making said first bounding volume a root volume;
d) selecting a second part;
e) computing a second bounding volume for said second part;
f) creating a new root volume to contain said second bounding volume with said old root volume and second bounding volume as sub-volumes thereof;
g) selecting a third part;
h) computing a third bounding volume for said third part;
i) expanding said root volume to contain said third bounding volume and adding said third bounding volume as a sub-volume thereof;
j) selecting a first pair of said sub-volumes;
k) processing said selected sub-volumes through a predetermined combining algorithm which determines, based upon a geometric relationship between said sub-volumes and said root volume, whether or not said selected sub-volumes can be combined into a new bounding volume and:
  i) if they cannot be combined, selecting a new pair of sub-volumes and processing said selected pair of sub-volumes through step k),
  ii) if they can be combined:
    1) creating a new bounding volume with said selected sub-volumes as sub-volumes thereof,
    2) selecting a new pair of sub-volumes and processing said selected pair of sub-volumes through step k),
whereby sub-volumes of said root volume are tested to determine if they can combine into new bounding volumes to thereby create said hierarchy of bounding volumes; and utilizing said new bounding volumes as an approximation of the image of said sub-volumes in a computer generated display.

22. The method of claim 21 wherein the step of processing said selected sub-volumes through a predetermined combining algorithm comprises the steps of:
a) computing the combined volume of said selected sub-volumes; and
b) determining whether said combined volume is smaller than a predetermined percentage of the volume of the root volume:
  i) if it is not, determining that said selected pair of sub-volumes cannot be combined,
  ii) if it is, determining that said selected pair of sub-volumes can be combined.

23. The method of claim 22 wherein said predetermined percentage is selected as approximately 8.3%.

24. The method of claim 21 including the further step of:
predeterminedly repeating said steps to process all remaining parts such that a bounding volume hierarchy is created for all parts and part assemblies.

25. The method of claim 22 including the further step of:

predeterminedly repeating said steps to process all remaining parts such that a bounding volume hierarchy is created for all parts and part assemblies.

26. The method of claim 25 wherein said predetermined percentage is selected as approximately 8.3%.

27. The method of claim 21 wherein the steps of computing said bounding volumes comprises the step of;
creating bounding boxes having the eight corners thereof selected to bound the selected part.

28. The method of claim 22 wherein the steps of computing said bounding volumes comprises the step of;
creating bounding boxes having the eight corners thereof selected to bound the selected part.

29. A method for creating a tight, spatially balanced hierarchy of bounding volumes from an arbitrary distribution of parts for use as successive approximations to the original parts and part assemblies, comprising the steps of:
a) selecting a first part;
b) computing a bounding volume for said first part;
c) determining if a root volume exists and:
   i) if it does not:
      1) making the current volume the root volume, and
      2) selecting a new object and proceeding with step b),
   ii) if it does, proceeding with step d);
d) determining if the root volume has sub-volumes:
   i) if it does not:
      1) creating a new root volume with the old root volume and new selected volume as sub-volumes;
      2) selecting a new object and proceeding with step b);
   ii) if it does, proceeding with step e);
e) expanding the root volume to contain the new selected volume and adding the new selected volume as a sub-volume thereof;
f) selecting a first pair of sub-volumes;
g) processing said selected sub-volumes through a predetermined combining algorithm which determines whether or not said selected sub-volumes can be combined into a new bounding volume which is representative of said sub-volumes, and:
   i) if they cannot be combined, selecting a new pair of sub-volumes and proceeding to step g),
   ii) if they can be combined, proceeding to step h);
h) determining if the first of the selected sub-volumes has sub-volumes and:
   i) if it does:
      1) expanding the first selected sub-volume to contain the second selected sub-volume, and
      2) if it does not, proceeding to step f);
   ii) if it does not, proceeding to step i);
i) determining if the second of the selected sub-volumes has sub-volumes and:
   i) if it does:
      1) expanding the second selected sub-volume to contain the first selected sub-volume, and
      2) proceeding to step f),
   ii) if it does not, proceeding to step j); and
j) creating a new volume with the first and second selected sub-volumes as sub-volumes thereof and selecting a new pair of sub-volumes and proceeding to step g),
whereby sub-volumes of said root volume are tested to determine if they can combine into new bounding volumes to thereby create said hierarchy of bounding volumes; and
k) utilizing the new bounding volume as an approximation of the image of said sub-volumes in a computer generated display.

30. The method of claim 29 wherein the step of processing said selected sub-volumes through a predetermined combining algorithm comprises the steps of:

a) computing the combined volume of said selected sub-volumes; and
b) determining whether said combined volume is smaller than a predetermined percentage of the volume of the root volume:
   i) if it is not, determining that said selected pair of sub-volumes cannot be combined, and
   ii) if it is, determining that said selected pair of sub-volumes can be combined.

31. The method of claim 30 wherein said predetermined percentage is selected as approximately 8.3%.

32. The method of claim 29 including the further step of: predeterminedly repeating said steps to process all remaining parts such that a bounding volume hierarchy is created for all parts and part assemblies.

33. The method of claim 30 including the further step of: predeterminedly repeating said steps to process all remaining parts such that a bounding volume hierarchy is created for all parts and part assemblies.

34. The method of claim 29 wherein the steps of computing said bounding volumes comprises the step of:
creating bounding boxes having the eight corners thereof selected to bound the selected part.

35. The method of claim 30 wherein the steps of computing said bounding volumes comprises the step of:
creating bounding boxes having the eight corners thereof selected to bound the selected part.

36. A method for processing an arbitrary collection of geometric objects into a hierarchy of bounding volumes, from a root volume bounding all objects, to sub-volumes bounding individual objects or assemblies thereof, for use as successive approximations to said objects, in a computer generated representation therefore comprising the steps of:
a) creating bounding volumes for said objects;
b) processing selected bounding volumes through a predetermined combining algorithm to determine whether or not, based upon a geometric relationship between said bounding volumes and the root volume, the selected bounding volumes can be combined into a new volume representative of said selected bounding volumes, and with respect to those bounding volumes which can be combined;
c) creating a new bounding volume with said combined bounding volumes comprising sub-volumes thereof, whereby the new bounding volume approximates the spatial relationship of said sub-volumes,
d) recursively applying steps b) and c) to said new bounding volume treating the new bounding volume as the root volume; and
e) utilizing said new bounding volume as an approximation of the spatial relationship of said sub-volumes in a computer generated representation therefore.

37. The method of claim 36 wherein the step is processing selected bounding volumes through a predetermined combining algorithm comprises the steps of:
selected at least two bounding volumes;
computing the combined volume of said selected bounding volumes;
determining whether said combined volume is smaller than a predetermined percentage of the volume of the root volume and:
   a) if it is not, determining that said selected bounding volumes cannot be combined and not attempting to combine same, and
   b) if it is, determining that said selected bounding can be combined.

38. The method of claim 37 wherein said predetermined percentage is selected as approximately 8.3%.

39. The method of claim 37 wherein the step of processing selected bounding volumes through a predetermined combining algorithm comprises the further step of:

in attempting to combine a new bounding volume into a parent volume which contains at least two sub-volumes, determining whether adding the new bounding volume expands the parent volume and, if it does, determining that none of the parent's sub-volumes can combine and not attempting to combine same.

40. The method of claim 37 wherein the step of processing selected bounding volumes through a predetermined combining algorithm comprises the further step of:

in attempting to combine sub-volumes contained within a parent volume, determining if the smallest sub-volume is larger than said predetermined percentage of the volume of said parent volume and, if it is, determining that none of the parent's sub-volumes can combine and not attempting to combine same.

41. The method of claim 40 wherein the step of processing selected bounding volumes through a predetermined combining algorithm comprises the further step of:

identifying each sub-volume having a volume greater than one tenth of said predetermined percentage of the parent volume and determining that each such sub-volume cannot be combined with other volumes and not attempting to combine same.

42. The method of claim 36 wherein the step of processing selected bounding volumes through a predetermined combining algorithm comprises the further step of:

in attempting to combine a new bounding volume into a parent volume which contains at least two sub-volumes, determining whether said new bounding volume can combine with one of said sub-volumes and, if it can, determining that the remaining sub-volumes cannot combine and not attempting to combine same.

43. A method for creating a tight, spatially balanced hierarchy of bounding volumes from an arbitrary distribution of parts for use as successive approximations to be the original parts and part assemblies, in a computer generated representation thereof comprising the steps of:

a) selecting a first part;
b) computing a bounding volume for said first part;
c) determining if a root volume exists and;
  i) if it does not:
    1) making the current volume the root volume, and
    2) selecting a new object and proceeding with step b),
  ii) if it does, proceeding with step d);
d) determining if the root volume has sub-volumes;
  i) if it does not;
    1) creating a new root volume with the old root volume and new selected volume as sub-volumes thereof;
    2) selecting a new part and proceeding with step b),
  ii) if it does, proceeding with step e);
e) expanding the root volume to contain a new selected volume, N, and adding the new selected volume as a sub-volume thereof;
f) selecting a first, previously existing, sub-volume, M;
g) computing the combined volume of selected sub-volume M and newly inserted sub-volume, N;
h) determining if said combined volume is smaller than a predetermined percentage of the parent volume and;
  i) if it is not, selecting a next, previously existing sub-volume, M, and proceeding to step g) unless all previously existing sub-volumes have been previously selected, in which case proceed to step l);
  ii) if it is, proceeding to step i);
i) determining whether sub-volume M has sub-volumes, and:
  i) if it does,
    a) expanding volume M to contain volume N and proceeding to step l),
  ii) if it does not, proceeding to step j);
j) determining whether sub-volume N has sub-volumes, and:
  i) if it does,
    a) expanding volume N to contain volume M,
    b) selecting the next, previously existing sub-volume, M, and
    proceeding to step g) unless all previously existing sub-volumes have been previously selected, in which case proceeding to step l);
  ii) if it does not, proceeding to step k);
k) creating a new volume with N and M as sub-volumes and proceeding to step l);
l) determining whether N was merged with a previously existing sub-volume and:
  i) if it was not, selecting a new object and proceeding with step b),
  ii) if it was, proceeding with step m);
m) determining if the parent volume of N increased by the inclusion of N, and:
  i) if it did not, selecting a new object and proceeding with step b),
  ii) if it did, proceeding with step n);
n) determining if the smallest sub-volume within the parent volume is smaller than a predetermined percentage of the parent volume, and:
  i) if it is not, selecting a new object and proceeding with step b),
  ii) if it is, proceeding with step o);
o) selecting a first pair of sub-volumes A, B;
p) computing the combined volume of selected volumes A and B;
q) determining if said combined volume is less than a predetermined percentage of the parent volume, and
  i) if it is not, selecting a new pair of sub-volumes A, B and proceeding to step p);
  ii) if it is, proceeding to step r);
r) determining if the first sub-volume A has sub-volumes and:
  i) if it does:
    1) expanding the first selected sub-volume A to contain the second selected sub-volume B, and
    2) proceeding to step f),
  ii) if it does not, proceeding to step s)
s) determining if the second selected sub-volume B has sub-volumes and:
  i) if it does:
    1) expanding the second selected sub-volume to contain the first selected sub-volume A, and
    2) proceeding to step f),
  ii) if it does not, proceeding to step t); and
t) creating a new volume with the selected sub-volumes A, B as sub-volumes thereof and selecting a new pair of sub-volumes A, B, and proceeding to step b),
whereby sub-volumes are tested to determine if they can combine into new bounding volumes to thereby create said hierarchy of bounding volumes and
u) utilizing said new bounding volumes as an approximation of said sub-volumes as an approximation of said sub-volumes in a computer generated representation thereof.

\* \* \* \* \*